(12) United States Patent
Rudd et al.

(10) Patent No.: US 12,205,258 B2
(45) Date of Patent: Jan. 21, 2025

(54) DOWNHOLE IMAGING

(71) Applicant: E.V. OFFSHORE LIMITED, Norwich (GB)

(72) Inventors: Jonathan Brian Rudd, Norwich (GB); Christopher Scott, Norwich (GB); Jonathan Thursby, Norwich (GB); John Blackwell, Ely (GB)

(73) Assignee: E.V. OFFSHORE LIMITED, Norwich (GB)

( * ) Notice: Subject to any disclaimer, the term of this patent is extended or adjusted under 35 U.S.C. 154(b) by 559 days.

(21) Appl. No.: 17/441,048

(22) PCT Filed: Mar. 20, 2020

(86) PCT No.: PCT/GB2020/050752
§ 371 (c)(1),
(2) Date: Sep. 20, 2021

(87) PCT Pub. No.: WO2020/193959
PCT Pub. Date: Oct. 1, 2020

(65) Prior Publication Data
US 2022/0156898 A1    May 19, 2022

(30) Foreign Application Priority Data
Mar. 22, 2019  (GB) .................................... 1903978

(51) Int. Cl.
*G06T 5/80*   (2024.01)
*E21B 47/002*   (2012.01)
(Continued)

(52) U.S. Cl.
CPC .............. *G06T 5/80* (2024.01); *E21B 47/002* (2020.05); *E21B 47/07* (2020.05); *G01K 13/00* (2013.01);
(Continued)

(58) Field of Classification Search
None
See application file for complete search history.

(56) References Cited

U.S. PATENT DOCUMENTS 6,141,034 A * 10/2000 McCutchen ......... H04N 13/363
348/E13.058
6,747,702 B1 * 6/2004 Harrigan ................ H04N 23/81
348/241

(Continued)

FOREIGN PATENT DOCUMENTS

EP    2372651 A1   10/2011
GB    2491577 A    12/2012

(Continued)

*Primary Examiner* — Reza Aghevli
(74) *Attorney, Agent, or Firm* — Hayes Soloway P.C.

(57) ABSTRACT

This invention relates to a method of imaging a downhole region of interest. In particular this invention relates to a method of processing images captured downhole to remove or reduce distortions due to the optical system as a function of the temperature experienced by the optical system in the downhole environment. A method of imaging a downhole region of interest comprises contemporaneously capturing an image of a region of interest and recording a temperature associated with the region of interest; selecting a pre-defined set of distortion data from a plurality of pre-defined sets of distortion data based on the recorded temperature; and applying the selected set of distortion data to the captured image to create an un-distorted image, wherein the pre-defined set of distortion data comprises distortion values associated with a range of field angles at a specified temperature.

14 Claims, 2 Drawing Sheets

(51) Int. Cl.
*E21B 47/07* (2012.01)
*G01K 13/00* (2021.01)
*G06T 7/00* (2017.01)
*G06T 7/70* (2017.01)
*G06T 7/90* (2017.01)
*G06V 10/143* (2022.01)
*G06V 10/25* (2022.01)
*G06V 10/75* (2022.01)
*H04N 23/55* (2023.01)
*H04N 23/56* (2023.01)
*H04N 23/698* (2023.01)
*H04N 23/90* (2023.01)
*H04N 23/50* (2023.01)

(52) U.S. Cl.
CPC .............. *G06T 7/0002* (2013.01); *G06T 7/70* (2017.01); *G06T 7/90* (2017.01); *G06V 10/143* (2022.01); *G06V 10/25* (2022.01); *G06V 10/751* (2022.01); *H04N 23/56* (2023.01); *H04N 23/698* (2023.01); *H04N 23/90* (2023.01); *G06T 2207/10024* (2013.01); *G06T 2207/30168* (2013.01); *G06T 2207/30172* (2013.01); *H04N 23/555* (2023.01)

(56) References Cited

U.S. PATENT DOCUMENTS

| | | | |
|---|---|---|---|
| 10,488,535 B2 * | 11/2019 | Perlman | G02B 5/1842 |
| 10,725,302 B1 * | 7/2020 | Sharma | G06F 3/012 |
| 10,852,817 B1 * | 12/2020 | Ouderkirk | G06V 40/18 |
| 11,323,669 B2 * | 5/2022 | Orlick | G03B 21/2053 |
| 2017/0172382 A1 * | 6/2017 | Nir | A61B 1/05 |
| 2018/0070033 A1 * | 3/2018 | Kolb | G06T 5/00 |
| 2018/0174326 A1 * | 6/2018 | Katchalov | G06T 7/37 |
| 2019/0206051 A1 * | 7/2019 | Cao | A61B 5/0037 |
| 2019/0261914 A1 * | 8/2019 | Davis | A61B 5/1034 |
| 2019/0328312 A1 * | 10/2019 | Schroeder | A61F 2/78 |
| 2020/0051443 A1 * | 2/2020 | Zhao | G08G 5/0086 |
| 2020/0064119 A1 * | 2/2020 | Gordon | G06T 7/73 |
| 2020/0073119 A1 * | 3/2020 | Urquhart | G02B 27/017 |
| 2020/0329220 A1 * | 10/2020 | Kaji | H04N 9/3185 |

FOREIGN PATENT DOCUMENTS

| | | | | |
|---|---|---|---|---|
| JP | 2009225119 A | * | 10/2009 | G06T 7/37 |
| JP | 2010026994 A | | 2/2010 | |
| WO | WO-2009112032 A1 | * | 9/2009 | C07H 21/00 |

* cited by examiner

DOWNHOLE IMAGING

CROSS-REFERENCE TO RELATED APPLICATIONS AND PRIORITY

This patent application claims priority from PCT Patent Application No. PCT/GB2020/050752 filed Mar. 20, 2020, which claims priority from Great Britain Patent Application No. 1903978.2 filed Mar. 22, 2019. Each of these patent applications are herein incorporated by reference in their entirety.

FIELD OF THE INVENTION

This invention relates to a method of imaging a downhole region of interest. In particular this invention relates to a method of processing images captured downhole to remove or reduce distortions due to the optical system as a function of the temperature experienced by the optical system in the downhole environment.

BACKGROUND TO THE INVENTION

A number of downhole tools exist that are able to provide a 360° view of an internal surface of a pipe or conduit. These tools are generally configured in one of three ways.

In a first type of inspection tool a camera having a wide angle of view is positioned at an end or tip of the tool. The field of view of the camera comprises a region ahead of the tool and includes a view of the internal surface of the pipe or conduit at a distance from the end of the tool. One disadvantage of this configuration is that the resultant image captured by the camera is highly distorted, especially at the periphery which includes the region of interest, namely the internal surface of the pipe. In particular, optical compression increases near the edges of the image resulting in a low resolution 360° view.

A second type of inspection tool includes a single, sideview camera that is mounted to view a region of the internal surface of the pipe located radially outwardly of the inspection tool. In order to capture a 360° view, the camera must be rotated about an axis of the tool. This has a number of disadvantages. Firstly, the motor may fail while the tool is deployed downhole, thereby restricting the images that may be captured. Secondly, the 360° view is typically achieved by rotating the camera and capturing a series of images that are then processed to create the full 360° image. This is a slow process and one that can only be practically implemented over a small area. Thirdly, for inspection tools that are memory only, i.e. they have no real-time link to an operator, there is no ability to rotate the camera. This solution is, therefore, not possible to implement in inspection tools deployed on slickline cable.

A further type of inspection tool utilises a plurality of cameras located around the circumference of the tool. The camera positions and the angle of view of each of the cameras are selected such that the cameras are able to cover a full 360° view of the internal surface of the pipe or conduit. The images captured by each of the cameras are then processed and stitched together to create the full 360° view. However, to enable the images to be stitched together accurately it is necessary to process the images to remove distortion caused by, for example, the combined effects of the curvature of the lens and the curvature of the pipe or conduit.

Distortion is a natural characteristic of any optical system (lens) and can have a greater or lesser influence on the fidelity of the image depending on both the focal length of the lens and the particular design of the lens. Typically, a short focal length lens with a wide or very wide field of view will exhibit more distortion than a long focal length, narrow field of view alternative. It is known that the magnitude of the distortion can be influenced by the design of the lens.

A further consideration is that downhole optical systems must operate at a range of temperatures. Some downhole environments have temperatures that exceed 100° C.

It is an object of the present invention to provide a method of imaging a downhole region of interest that overcomes a disadvantage of prior art systems whether referred to herein or otherwise.

SUMMARY OF THE INVENTION

The present invention provides a method of imaging a downhole region of interest comprising:
  contemporaneously capturing an image of said region of interest and recording a temperature associated with the region of interest;
  selecting a pre-defined set of distortion data from a plurality of pre-defined sets of distortion data based on the recorded temperature; and
  applying the selected set of distortion data to the captured image to create an un-distorted image,
  wherein the pre-defined set of distortion data comprises distortion values associated with a range of field angles at a specified temperature.

Preferably the distortion values comprise associated real ray height values and reference ray height values. The distortion values may comprise percentage distortion values.

The range of field angles is preferably between 0° and 90°. The range of temperatures is preferably between 10° C. and 200° C.

In preferred embodiments the captured image is a colour image. The camera capturing the image may include an infrared filter such that the image comprises colours in the visible spectrum. Each pixel of the captured colour image is preferably represented by an RGB colour value. In preferred embodiments, therefore, the plurality of pre-defined sets of distortion data comprises sets of distortion data calculated at different wavelengths of light for a given specified temperature. For a given specified temperature, sets of distortion data may be calculated for wavelengths corresponding to red light, green light and blue light.

In some embodiments a different selected set of distortion data may be applied to each of the red, green and blue colour channels of the captured image to create an un-distorted image. The selected set of distortion data may therefore be selected based on the recorded temperature and a wavelength of light.

The Method Preferably Comprises:
  calculating a proportional position of an output pixel in the un-distorted image associated with each reference ray height value of the selected set of distortion data;
  obtaining a target pixel position for each pixel in the un-distorted image, the target pixel position being a function of distance of that pixel from a central pixel of the un-distorted image;
  comparing, for each pixel in the un-distorted image, the target pixel position to said set of proportional positions of output pixels;
  selecting said output pixel proportional position that corresponds exactly to the target pixel position or, if none of the output pixel proportional positions correspond exactly to the target pixel position, selecting the two output pixel proportional positions closest to the target pixel position;

if an output pixel proportional position corresponds exactly to the target pixel position, retrieving the real ray height value associated with the reference ray height value corresponding to the output pixel proportional position, or retrieving the real ray height values associated with the reference ray height values corresponding to the selected two closest output pixel proportional positions and calculating an interpolated real ray height value based on the target pixel position;

calculating a source pixel location by converting said retrieved real ray height value or said interpolated real ray height value into a percentage position across the image sensor; and when the calculated source pixel location corresponds exactly to the location of a single pixel in the captured image, applying a property of the source pixel at the calculated source pixel location to the target pixel in the un-distorted image, or when the calculated source pixel location does not correspond exactly to the location of a single pixel in the captured image, calculating an interpolated property based on properties of the source pixels closest to the calculated source pixel location and applying the interpolated property to the target pixel in the un-distorted image.

The property of the source pixel may be an RGB colour value.

The method may further comprise interpolating between target pixels in the un-distorted image to apply a property or RGB colour value to all of the pixels in the un-distorted image. This may be necessary if the number of pixels in the un-distorted image is greater than the number of pixels in the captured image, and/or if a shape of a grid of pixels in the un-distorted image is different to a shape of a grid of pixels in the captured image. This may be the case if the captured image has barrel distortion or pincushion distortion.

In preferred embodiments the images of the region of interest are captured by a side view camera of a downhole inspection assembly. It may be desirable to capture a full 360° view of an internal surface of a wellbore or pipe. Accordingly, a plurality of overlapping images of the region of interest may be captured by a plurality of side view cameras spaced apart around a circumference of the inspection assembly. Preferably a cylindrical sapphire window extends around and covers the plurality of side view cameras.

In embodiments in which a plurality of cameras capture images of regions of interest simultaneously, the temperature associated with the region of interest may be the same for all of the simultaneously captured images. Alternatively a different recorded temperature may be associated with each image. This may, for example, be a temperature measured proximate the optical system of the camera.

Preferably the method further comprises illuminating the region of interest using a first lighting section of the inspection assembly on a first side of the camera and a second lighting section of the inspection assembly on a second side of the camera.

Preferably the images of the region of interest are captured by a camera including a plurality of lenses, each of the lenses being made from a glass material. In this way, the cameras are able to withstand the high temperatures encountered downhole.

BRIEF DESCRIPTION OF THE DRAWINGS

The invention will now be further described by way of example only and with reference to the accompanying drawings in which.

DESCRIPTION OF THE PREFERRED EMBODIMENTS

Figure 1:
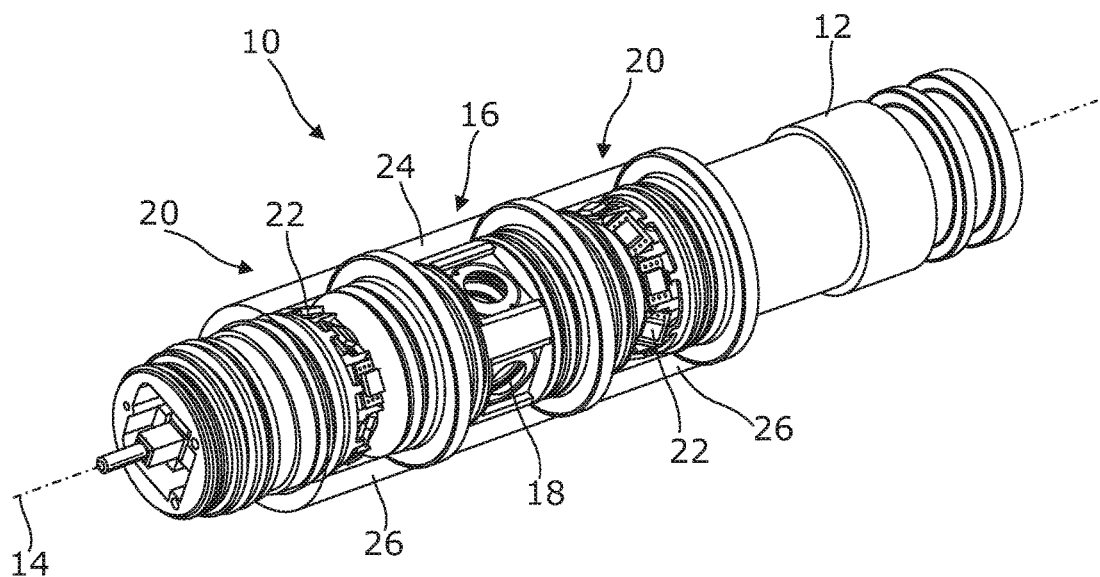
FIG. 1 is a perspective view of a part of a downhole camera in accordance with a preferred embodiment of the present invention.
Figure 2:
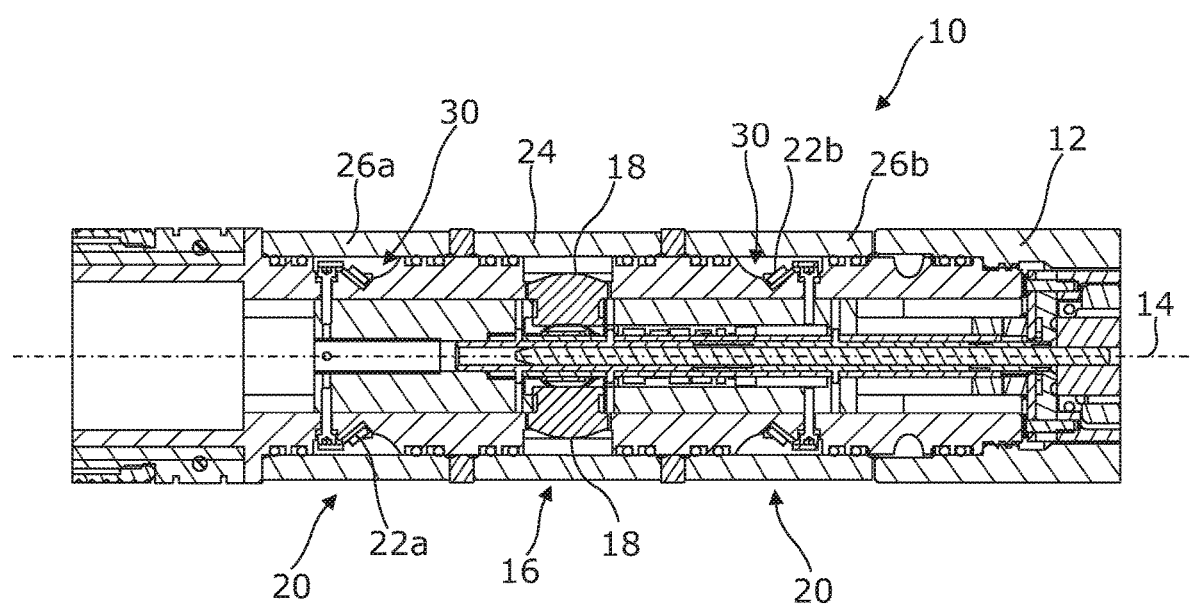
FIG. 2 is a longitudinal cross-sectional view of the camera of FIG. 1.

FIGS. 1 and 2 show an inspection assembly or tool 10 in accordance with the invention. The inspection assembly 10 comprises an elongate housing 12 having a longitudinal axis 14.

The inspection assembly 10 comprises a camera section 16, including an arrangement of side view cameras 18, and two lighting sections 20, including light sources 22 arranged to emit light to illuminate the field of view of the cameras 18.

The cameras 18 are arranged to view an internal surface of a wellbore. The camera section 16 further comprises a viewport or window 24 through which the cameras 18 capture images of the field of view. Similarly, each of the lighting sections 20 comprises a light transmitting window element 26 covering the light sources 22.

The inspection assembly 10 will typically be used to image an internal surface of a pipe or conduit within which the inspection assembly 10 is located. In particular, the inspection assembly 10 of the present invention may be used to image an internal surface of a wellbore or casing. The wellbore or casing may have an internal diameter of between 50 mm and 255 mm. The external diameter of the inspection assembly 10 preferably has a maximum external diameter of about 43 mm. The maximum external diameter may be between 30 mm and 50 mm, and is more preferably between 40 mm and 45 mm.

Furthermore, the inspection assembly 10 must be able to operate in temperatures up to 150° C. and at pressures of up to 15 kpsi (103 MPa).

When the inspection assembly 10 is used to image a wellbore or casing, the inspection assembly 10 may be deployed on slickline cable or e-line cable. If the inspection assembly is deployed on slickline cable, images captured by the one or more cameras are stored in a memory of the inspection assembly. If the inspection assembly 10 is deployed on e-line cable, images captured by the one or more cameras may be stored in a memory of the inspection assembly and/or transmitted in real-time to a receiver which will typically be located at ground level. Deploying the inspection assembly 10 on e-line cable therefore allows live images to be transmitted to a controller at a location remote from the inspection assembly and/or wellbore.

The camera or cameras 18 of the inspection assembly 10 may capture still images and/or video images. Images may be captured at up to 25 frames per second.

In this embodiment the inspection assembly 10 includes four side view cameras 18 arranged to capture an image of an internal surface of the wellbore or conduit surrounding the inspection assembly 10. The four cameras 18 are configured such that an optical axis of the field of view of each of the cameras 18 extends substantially radially from the inspection assembly 10. Additionally, the four cameras 18 are preferably spaced apart equidistantly around the circumference of the housing 12 of the inspection assembly 10. In order to form a composite and complete 360° image of the internal surface of a wellbore, the side view cameras 18 are preferably arranged in a single plane transverse to the longitudinal axis 14 of the inspection assembly 10.

Each of the two lighting sections 20 includes a lighting array, and the lighting arrays are located adjacent the side view cameras 18 to illuminate the field of view. The lighting arrays are spaced apart in a direction along the longitudinal axis 14 of the inspection assembly 10 and a first array, in a first lighting section 20, is located on a first side of the cameras 18 and a second array, in a second lighting section 20, is located on a second side of the cameras 18.

The first array or set of light emitters 22 is disposed circumferentially around the housing 12 and configured to illuminate an annular region around the inspection assembly 10. The second array or set of light emitters 22 is also disposed circumferentially around the housing 12 and configured to illuminate an annular region around the inspection tool 10. The first set of light emitters 22 is located in a first plane on a first side of the cameras 18 and the second set of light emitters 22 is located in a second plane on a second, opposite side of the cameras 18. In particular the first set of light emitters 22 is disposed between the camera viewport 24 and a first end of the housing 12 and the second set of light emitters 22 is disposed between the camera viewport 24 and a second end of the housing 12. The first and second planes are preferably substantially perpendicular to the longitudinal axis 14 and the first and second planes are preferably spaced apart along the longitudinal axis 14 of the inspection assembly 10.

Each of the light sources 22 is mounted in or disposed within a recess 30 in a part of an outer surface of the housing 12. Each recess 30 preferably has a substantially conical sidewall such that an opening in the outer surface of the housing 12 has a larger diameter than a base of the recess 30. The light source 22 is preferably located at the base of the recess 30.

In preferred embodiments each of the light sources 22 is mounted in a recess 30 at an angle of less than 90° to the longitudinal axis 14 and such that a centreline or optical axis of the light emitted by the light source 22 extends in a direction towards the centre of the field of view of the camera. In order to maximise the intensity of light illuminating the field of view the conical recess 30 is preferably also angled.

The cylindrical window element 26 extends around part of the outer surface of the housing 12 and covers each of the recesses 30 corresponding to light sources 22 in one of the lighting arrays. As such, a first window element 26a extends around the housing 12 and covers the first set of light sources 22a and a second window element 26a extends around the housing 12 and covers the second set of light sources 22a. Each of the window elements 26 is made from a single piece of light transmitting material. Preferably each of the window elements 26 is made from sapphire.

Similarly, a cylindrical window element 24 extends around and covers each of the side view cameras 18 in the camera section 16. The window element 24 is preferably made from sapphire.

Each of the window elements 24, 26 preferably has a thickness of between 3.5 mm and 6.0 mm and more preferably between 4 mm and 5.5 mm. Each window element 24, 26 has a cylindrical inner surface that contacts a part of the outer surface 32 of the housing 12 around the recesses 30. Suitable o-rings may be located between the inner surface of the window element 24, 26 and a part of the housing 12 in order to create the required seal between the window element 24, 26 and the housing 12. An outer surface of each of the window elements 24, 26 forms a part of an external surface of the inspection assembly 10.

Making the window elements 24, 26 from sapphire, with a high tensile strength, also means that the window element 24, 26 is able to withstand the high pressures encountered in some wellbores. Sapphire also has the advantage that it is very hard and resistant to impacts and scratches. It has been found that the sapphire window elements must have a minimum thickness of 4 mm to withstand pressures of up to 103 MPa.

It is known, however, that sapphire has a high refractive index of 1.7. The inclusion of the sapphire window 24, therefore, acts to restrict the fields of view of the cameras 18. The configuration of a group of lenses 40 of each of the cameras 18 is, therefore, designed to take account of the effect of the curved sapphire window 24, such that each camera 18 still has sufficient angle of view to form a complete 360° view of the internal surface of the wellbore or casing surrounding the inspection assembly 10.

Figure 3:
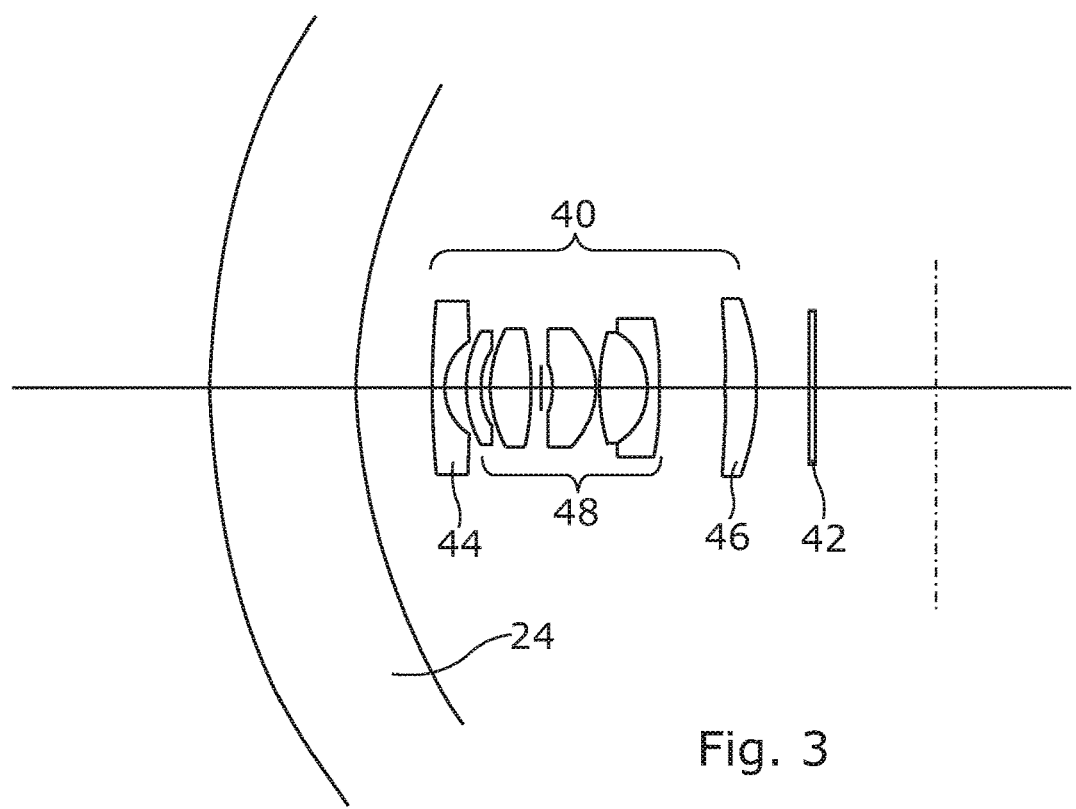
FIG. 3 illustrates a horizontal view of a lens arrangement in accordance with the present invention.
Figure 4:
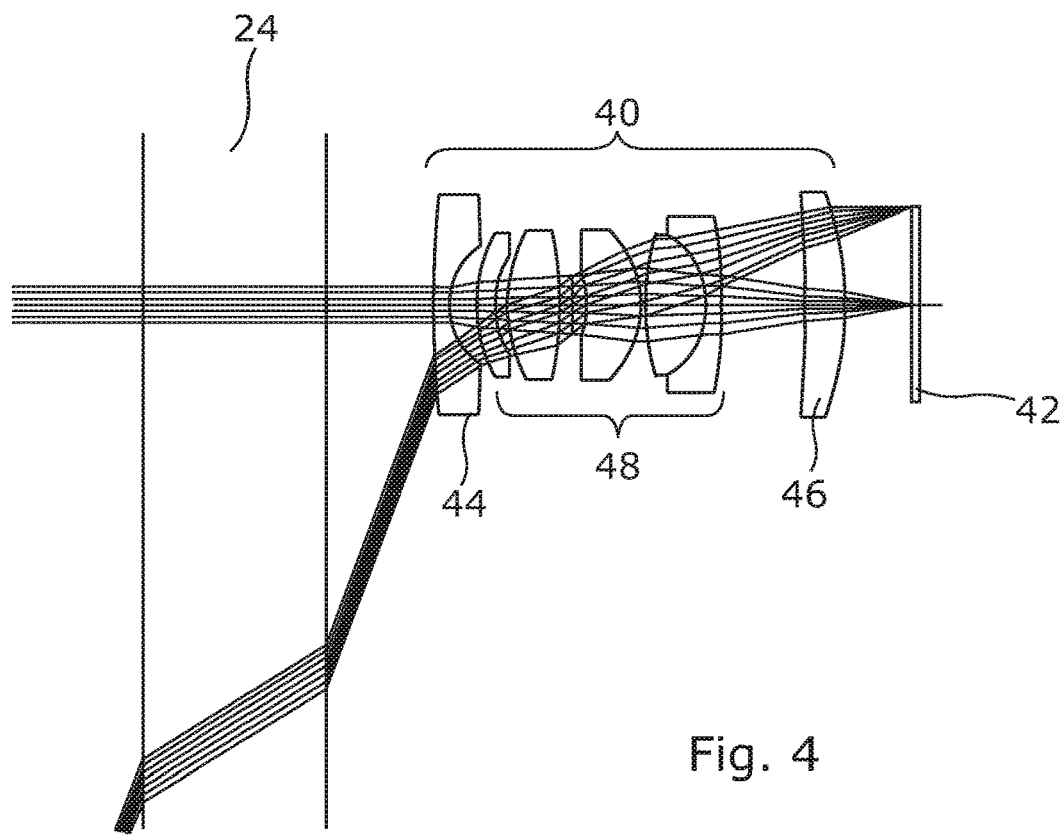
FIG. 4 illustrates a vertical view of light ray paths associated with the lens arrangement of FIG. 3.

As shown in FIGS. 3 and 4 the group of lenses 40 of the camera 18 is disposed between an image sensor 42 of the camera 18 and the sapphire window 24. A length of the group of lenses 40 extends between a front surface of a front lens 44 and a rear surface of a rear lens 46. Preferably the length of the group of lenses 40 is between 9 mm and 10 mm, and is preferably about 9.3 mm. The group of lenses 40 is oriented such that the front lens 44 is closest to the sapphire window 24 and the rear lens 46 is closest to the image sensor 42. A distance between the front surface of the front lens 44 and an internal surface of the sapphire window 24 is preferably between 2 mm and 3 mm, and is preferably about 2.25 mm. A distance between the rear surface of the rear lens 46 and a plane of the image sensor 42 is preferably about 2 mm, and more preferably about 1.7 mm.

The group of lenses 40 comprises at least one further lens 48 disposed between the front lens 44 and the rear lens 46. As illustrated in FIG. 3, in preferred embodiments the group of lenses 40 includes a plurality of lenses 48 between the front lens 44 and the rear lens 46, and most preferably includes five lenses between the front and rear lenses 44, 46.

The group of lenses 40 and sapphire window element 24, collectively referred to as the optical system or lens arrangement, are configured such that an angle of view of the camera 18 is between about 65° and 85°, and more preferably between about 70° and 80°. It will be appreciated that the angle of view of the camera 18 will also be affected by the type of fluid in which the inspection assembly 10 is disposed in the wellbore. If the inspection assembly 10 is in air then the angle of view will be greater than if the inspection assembly 10 is disposed in water or another liquid. In a preferred embodiment the lens arrangement, including the group of lenses 40 and the sapphire window 24, is such that the angle of view in air is about 80° and the angle of view in water is about 72.5°.

These angles of view are selected such that there is overlap in the fields of view of adjacent cameras 18 of the inspection assembly 10 over a required range of wellbore pipe internal diameters. This means that, when the inspection assembly 10 captures images of the internal surface of the wellbore pipe, edge regions of the images will overlap.

This allows the images to be stitched together or mosaicked during a post-processing step to create a full 360° view of the surface of the pipe.

To allow accurate stitching of the images it is important that the images exhibit low distortion, preferably less than 10%. Typically this requires a complex hyperbolic lens which is difficult to manufacture in a compact physical size without using optics made of a polymeric or plastics material. The inspection tool 10 of the present invention is, however, required to operate downhole in temperatures up to 150° C. Accordingly, in preferred embodiments, all of the lenses of the group of lenses 40 of each camera 18 are made of a glass material.

Additionally, it is known that optical materials expand and contract with temperature, due to the thermal coefficient of expansion of the materials, and the refractive index and dispersive nature of the glass from which the lenses is made also varies with temperature. This means that the focal length, focal condition and distortion of the lenses all vary with temperature.

According to the present invention the magnitude of the distortion of the lens arrangement is predicted over a range of temperatures at which the thermal properties of the glass (that is used to make the lenses 44, 46, 48) have been assessed.

As will be known to a person skilled in the art there are a number of ways of defining or calculating distortion.

Percentage Distortion

Distortion in percent is defined as the real chief ray height (a ray that passes through the centre of the iris), minus the reference ray height, divided by the reference ray height, times 100:

$$\text{Distortion} = 100 \times ((y_{chief} - y_{ref})/(y_{ref}))$$

where all heights are taken to be the image surface radial coordinate. The reference ray height is computed by tracing a real ray from a very small field height, and then scaling the results as required.

FTan(Theta) Distortion

In this definition the reference height for the undistorted ray in a rotationally symmetric system at paraxial focus is given by, $$y_{ref} = f \tan \theta$$

where f is the focal length and theta($\theta$) is the angle in object space. This definition is generally used for optical systems having a field angle of 90° or greater.

F-Theta Distortion

In this definition the reference height for the undistorted ray at the paraxial focal plane is given by, $$Y_{ref} = f\theta$$

where f is the focal length and theta($\theta$) is the angle in object space. This definition is generally used in systems in which the image height must be linear with scan angle. Furthermore, this definition is used for optical systems in which the object is at infinity, when field heights are measured in angles.

In the present invention the percentage distortion is calculated using a reference height given by the above FTan (theta) Distortion definition. The object that is being imaged, i.e. the internal wall of the wellbore pipe, is not at infinity and accordingly it is not appropriate to use the F-Theta Distortion definition. It has been found that, although generally these algorithms should be applied to rotationally symmetric optical systems with planar object fields, the percentage distortion figures obtained through these calculations are sufficiently accurate to correct the distortion in the captured images of a curved pipe surface.

In preferred embodiments of the present invention a calculation of the percentage distortion is obtained for a range of field angles, at a given temperature. This results in a table of distortion data including percentage distortion values, and the associated real ray height and reference ray height values, against field angles. This distortion data is calculated over the same range of field angles at a plurality of different temperatures. The range of field angles is preferably between 0° and 90° and more preferably between 0° and 80°. Furthermore the plurality of different temperatures are preferably within a temperature range of 10° C. to 200° C. and more preferably in a temperature range of 20° C. to 150° C.

The images captured by the cameras 18 of the inspection assembly 10 are preferably colour images. In preferred embodiments each of the cameras 18 includes an infrared filter so that the cameras 18 only capture light in the visible part of the spectrum. Accordingly, each pixel of the captured image may be represented by an RGB triplet or set of RGB values in the RGB colour model. It is therefore desirable for the distortion data to be calculated at different wavelengths, for example at wavelengths corresponding to red, green and blue light.

Tables 1 and 2 below provide an example of data calculated at temperatures of 20° C. and 80° C. for light having a wavelength of 588 nm.

Each table of distortion data is stored as a separate lookup table for use in post-processing the images captured by the inspection assembly (input image or source image) to form an undistorted image (output image).

TABLE 1

| | (20° C.) | | |
|---|---|---|---|
| Y Angle (deg) | Real Height (mm) | Ref. Height (mm) | Distortion (%) |
| 0.0 | 0.0000 | 0.0000 | 0.0000 |
| 2.4 | 0.0935 | 0.0935 | −0.0689 |
| 4.8 | 0.1869 | 0.1874 | −0.2757 |
| 7.2 | 0.2801 | 0.2819 | −0.6205 |
| 9.6 | 0.3732 | 0.3774 | −1.1037 |
| 12.0 | 0.4661 | 0.4743 | −1.7258 |
| 14.4 | 0.5587 | 0.5729 | −2.4873 |
| 16.8 | 0.6508 | 0.6737 | −3.3888 |
| 19.2 | 0.7426 | 0.7770 | −4.4314 |
| 21.6 | 0.8338 | 0.8834 | −5.6157 |
| 24.0 | 0.9245 | 0.9935 | −6.9429 |
| 26.4 | 1.0144 | 1.1076 | −8.4141 |
| 28.8 | 1.1036 | 1.2267 | −10.0304 |
| 31.2 | 1.1920 | 1.3513 | −11.7931 |
| 33.6 | 1.2793 | 1.4825 | −13.7035 |
| 36.0 | 1.3656 | 1.6212 | −15.7630 |
| 38.4 | 1.4507 | 1.7685 | −17.9729 |
| 40.8 | 1.5344 | 1.9260 | −20.3347 |
| 43.2 | 1.6166 | 2.0954 | −22.8496 |
| 45.6 | 1.6971 | 2.2786 | −25.5191 |
| 48.0 | 1.7757 | 2.4781 | −28.3443 |
| 50.4 | 1.8523 | 2.6972 | −31.3262 |
| 52.8 | 1.9265 | 2.9397 | −34.4657 |
| 55.2 | 1.9981 | 3.2105 | −37.7631 |
| 57.6 | 2.0668 | 3.5160 | −41.2183 |
| 60.0 | 2.1322 | 3.8648 | −44.8302 |
| 62.4 | 2.1940 | 4.2681 | −48.5967 |
| 64.8 | 2.2517 | 4.7418 | −52.5140 |
| 67.2 | 2.3050 | 5.3081 | −56.5765 |

TABLE 1-continued (20° C.)

| Y Angle (deg) | Real Height (mm) | Ref. Height (mm) | Distortion (%) |
|---|---|---|---|
| 69.6 | 2.3534 | 5.9999 | −60.7759 |
| 72.0 | 2.3966 | 6.8673 | −65.1013 |
| 74.4 | 2.4343 | 7.9917 | −69.5392 |
| 76.8 | 2.4664 | 9.5133 | −74.0739 |
| 79.2 | 2.4928 | 11.6970 | −78.6883 |
| 80.0 | 2.5004 | 12.6545 | −80.2411 |

TABLE 2

(80° C.)

| Y Angle (deg) | Real Height (mm) | Ref. Height (mm) | Distortion (%) |
|---|---|---|---|
| 0.0 | 0.0000 | 0.0000 | 0.0000 |
| 2.4 | 0.0934 | 0.0935 | −0.0689 |
| 4.8 | 0.1868 | 0.1873 | −0.2757 |
| 7.2 | 0.2801 | 0.2818 | −0.6205 |
| 9.6 | 0.3731 | 0.3773 | −1.1038 |
| 12.0 | 0.4660 | 0.4742 | −1.7259 |
| 14.4 | 0.5585 | 0.5728 | −2.4874 |
| 16.8 | 0.6507 | 0.6735 | −3.3890 |
| 19.2 | 0.7424 | 0.7768 | −4.4316 |
| 21.6 | 0.8336 | 0.8832 | −5.6160 |
| 24.0 | 0.9242 | 0.9932 | −6.9432 |
| 26.4 | 1.0142 | 1.1074 | −8.4145 |
| 28.8 | 1.1034 | 1.2264 | −10.0308 |
| 31.2 | 1.1917 | 1.3510 | −11.7936 |
| 33.6 | 1.2790 | 1.4821 | −13.7041 |
| 36.0 | 1.3653 | 1.6207 | −15.7637 |
| 38.4 | 1.4503 | 1.7681 | −17.9737 |
| 40.8 | 1.5340 | 1.9255 | −20.3356 |
| 43.2 | 1.6161 | 2.0948 | −22.8506 |
| 45.6 | 1.6966 | 2.2780 | −25.5202 |
| 48.0 | 1.7753 | 2.4775 | −28.3455 |
| 50.4 | 1.8518 | 2.6965 | −31.3276 |
| 52.8 | 1.9260 | 2.9389 | −34.4672 |
| 55.2 | 1.9975 | 3.2097 | −37.7647 |
| 57.6 | 2.0662 | 3.5151 | −41.2200 |
| 60.0 | 2.1316 | 3.8638 | −44.8320 |
| 62.4 | 2.1933 | 4.2671 | −48.5986 |
| 64.8 | 2.2510 | 4.7406 | −52.5160 |
| 67.2 | 2.3043 | 5.3068 | −56.5786 |
| 69.6 | 2.3527 | 5.9983 | −60.7780 |
| 72.0 | 2.3959 | 6.8656 | −65.1034 |
| 74.4 | 2.4336 | 7.9897 | −69.5413 |
| 76.8 | 2.4656 | 9.5109 | −74.0759 |
| 79.2 | 2.4920 | 11.6941 | −78.6901 |
| 80.0 | 2.4995 | 12.6513 | −80.2428 |

During inspection of a wellbore each of the cameras 18 of the inspection assembly 10 captures an image of a region of interest and, contemporaneously, a temperature of the inspection assembly 10 is recorded. This recorded temperature is then associated with each of the captured images, i.e. each of the captured images has an associated temperature at which the image was captured.

The temperature may be a temperature of the external environment surrounding the inspection assembly 10. For example, the temperature may be a measured temperature of the fluid in which the inspection assembly 10 is disposed. In other embodiments the temperature may be an internal of the inspection assembly 10. Preferably the temperature is a temperature measured in the vicinity of the optical systems of the cameras 10, so as to most accurately reflect the temperature at which the camera 18 is operating.

Once an image has been captured, post processing of the image comprises running a distortion routine to produce an output image in which the image distortion due to the optical system of the camera 18, present in the input image, is removed or reduced.

There are a number of ways the distortion data calculated at different wavelengths (at the same temperature) may be utilised during post-processing of the input images. In one embodiment of the invention a single wavelength is selected and post-processing of all of the required input images is carried out using distortion data calculated for that wavelength. In other embodiments an average of the each of the values of the distortion data is calculated across all of the wavelengths, to produce a set of averaged distortion data for a given temperature.

In yet further embodiments each of the red, green and blue colour channels of the image may be considered separately. In these embodiments a different distortion correction factor may be applied to each of the three values of the RGB value for each pixel. In other words the output image is formed by combining a corrected "red image", a corrected "green image" and a corrected "blue image". This may have the advantage of reducing colour fringing in the output image compared to the input image.

During post processing, for each input (source) image the first step is to select a lookup table of distortion data based on the temperature associated with the input (captured) image. Optionally, the lookup table may be additionally selected based on the wavelength of light, if separate distortion routines are run for each of the red, green and blue colour channels as discussed above.

Post processing of the input image then further comprises the following method steps (which may be carried out in any suitable order):

1. Calculating a pixel position in an output (undistorted) image for each 'Reference Height'.

The proportional position of the output pixel in the output image may be expressed as:

$$PP_{output}(Ref\ Height\ N) = \frac{[Ref\ Height\ N]}{[Max\ Ref\ Height] - [Min\ Ref\ Height]}$$

For example, given the data in Table 1. For the Ref. Height value 0.6737, the proportional position of the output pixel is calculated as:

$$PP_{output}(0.6737) = \frac{[0.6737]}{[12.6545] - [0]} = 0.0532$$

2. Obtaining for each pixel of an output (undistorted) image a target pixel position; the target pixel position being a function of the distance of that pixel from a central pixel of the image.

Accordingly, the target pixel position may be expressed as:

$$PP_{target}(Pixel\ n) = \frac{[distance\ from\ pixel\ n\ to\ central\ pixel]}{[distance\ from\ edge\ pixel\ to\ central\ pixel]}$$

3. Comparing, for a given pixel in the output image, the target pixel position to the set of calculated output pixel proportional positions.
4. Selecting the output pixel proportional position that corresponds exactly to the target pixel position or, if none of the output pixel proportional positions correspond exactly to the target pixel position, selecting the two output pixel proportional positions closest to the target pixel position.

5. Either
   (a) retrieving the Real Height value associated with the Reference Height value corresponding to the selected output pixel proportional position (if an output pixel proportional position corresponded exactly to the target pixel position)
   or
   (b) retrieving the Real Height values associated with the Reference Height values corresponding to the selected two closest output pixel proportional positions and calculating an interpolated Real Height value based on the target pixel position.

6. Calculating a source pixel location by converting the retrieved Real Height value or interpolated Real Height value into a percentage position across the image sensor, given a known diameter of the lens.

7. Either
   (a) when the calculated source pixel location corresponds exactly to the location of a single pixel in the input image, applying the RGB colour values of the source pixel at the calculated source pixel location to the target pixel in the output image,
   or
   (b) when the calculated source pixel location does not correspond exactly to the location of a single pixel in the input image, calculating an interpolated RGB colour value based on the RGB colour values of the source pixels closest to the calculated source pixel location and applying the interpolated RGB colour value to the target pixel in the output image.

It will be appreciated that once an RGB colour value has been assigned to each of the target pixels of the output image further colour blending steps may be required. This may be necessary, for example, if the pixel grid of the output image is larger than the pixel grid of the input image such that it is necessary to interpolate between target pixels in the output image in order to apply a suitable RGB colour value to all of the pixels in the output image.

The present invention therefore provides a method of imaging a downhole region of interest that removes or reduces distortion in a captured image to allow more accurate utilisation of the images, for example for stitching images together to form a complete 360° view of the wellbore or for measuring sizes of objects in the images such as regions of corrosion.

The invention claimed is:

1. A method of imaging a downhole region of interest comprising:
   contemporaneously capturing a colored image of said region of interest and recording a temperature associated with the region of interest;
   selecting a pre-defined set of distortion data from a plurality of pre-defined sets of distortion data based on the recorded temperature; and
   applying the selected set of distortion data to the captured image to create an un-distorted image,
   wherein the pre-defined set of distortion data comprises distortion values associated with a range of field angles at a specified temperature,
   wherein the plurality of pre-defined sets of distortion data comprises sets of distortion data calculated at different wavelengths of light for a given specified temperature,
   wherein, for a given specified temperature, sets of distortion data are calculated for wavelengths corresponding to red light, green light and blue light, and
   wherein a different selected set of distortion data is applied to each of the red, green and blue color channels of the captured image to create an un-distorted image, the selected set of distortion data being selected based on the recorded temperature and a wavelength of light.

2. The method of claim 1, wherein the distortion values comprise associated real ray height values and reference ray height values.

3. The method of claim 1, wherein the range of field angles is between 0° and 90°.

4. The method of claim 1, wherein the range of temperatures is between 10° C. and 200° C.

5. A method of imaging a downhole region of interest comprising:
   contemporaneously capturing an image of said region of interest and recording a temperature associated with the region of interest;
   selecting a pre-defined set of distortion data from a plurality of pre-defined sets of distortion data based on the recorded temperature; and
   applying the selected set of distortion data to the captured image to create an un-distorted image,
   wherein the pre-defined set of distortion data comprises distortion values associated with a range of field angles at a specified temperature, and wherein the distortion values comprise associated real ray height values and reference ray height values, and wherein the method further comprises:
   calculating a proportional position of an output pixel in the un-distorted image associated with each reference ray height value of the selected set of distortion data;
   obtaining a target pixel position for each pixel in the un-distorted image, the target pixel position being a function of distance of that pixel from a central pixel of the un-distorted image;
   comparing, for each pixel in the un-distorted image, the target pixel position to said set of proportional positions of output pixels;
   selecting said output pixel proportional position that corresponds exactly to the target pixel position or, if none of the output pixel proportional positions correspond exactly to the target pixel position, selecting the two output pixel proportional positions closest to the target pixel position;
   if an output pixel proportional position corresponds exactly to the target pixel position, retrieving the real ray height value associated with the reference ray height value corresponding to the output pixel proportional position, or retrieving the real ray height values associated with the reference ray height values corresponding to the selected two closest output pixel proportional positions and calculating an interpolated real ray height value based on the target pixel position;
   calculating a source pixel location by converting said retrieved real ray height value or said interpolated real ray height value into a percentage position across the image sensor; and
   when the calculated source pixel location corresponds exactly to the location of a single pixel in the captured image, applying a property of the source pixel at the calculated source pixel location to the target pixel in the un-distorted image, or when the calculated source pixel location does not correspond exactly to the location of a single pixel in the captured image, calculating an interpolated property based on properties of the source pixels closest to the calculated source pixel location and applying the interpolated property to the target pixel in the un-distorted image.

6. The method of claim 5, wherein the property of the source pixel is an RGB colour value.

7. The method of claim 5, further comprising interpolating between target pixels in the un-distorted image to apply a property or RGB colour value to all of the pixels in the un-distorted image.

8. The method of claim 1, wherein the images of the region of interest are captured by a side view camera of a downhole inspection assembly.

9. The method of claim 8, wherein a plurality of overlapping images of the region of interest are captured by a plurality of side view cameras spaced apart around a circumference of the inspection assembly.

10. The method of claim 9 wherein a cylindrical sapphire window extends around and covers the plurality of side view cameras.

11. The method of claim 8, further comprising illuminating the region of interest using a first lighting section of the inspection assembly on a first side of the camera and a second lighting section of the inspection assembly on a second side of the camera.

12. The method of claim 1, wherein the images of the region of interest are captured by a camera including a plurality of lenses, each of the lenses being made from a glass material.

13. A method of imaging a downhole region of interest comprising:
  contemporaneously capturing an image of said region of interest and recording a temperature associated with the region of interest;
  selecting a pre-defined set of distortion data from a plurality of pre-defined sets of distortion data based on the recorded temperature; and
  applying the selected set of distortion data to the captured image to create an un-distorted image,
  wherein the pre-defined set of distortion data comprises distortion values associated with a range of field angles at a specified temperature,
  wherein a plurality of overlapping images of the region of interest are captured by a plurality of side view cameras spaced apart around a circumference of a downhole inspection assembly, and a cylindrical sapphire window extends around and covers the plurality of side view cameras.

14. A method of imaging a downhole region of interest comprising:
  contemporaneously capturing an image of said region of interest and recording a temperature associated with the region of interest;
  selecting a pre-defined set of distortion data from a plurality of pre-defined sets of distortion data based on the recorded temperature; and
  applying the selected set of distortion data to the captured image to create an un-distorted image,
  wherein the pre-defined set of distortion data comprises distortion values associated with a range of field angles at a specified temperature,
  wherein the images of the region of interest are captured by a side view camera of a downhole inspection assembly and the method further comprises illuminating the region of interest using a first lighting section of the inspection assembly on a first side of the camera and a second lighting section of the inspection assembly on a second side of the camera.

* * * * *